United States Patent
Kida et al.

(10) Patent No.: US 8,391,867 B2
(45) Date of Patent: Mar. 5, 2013

(54) BASE STATION APPARATUS AND NEIGHBORING CELL INFORMATION MANAGEMENT METHOD

(75) Inventors: Hiroyuki Kida, Kawasaki (JP); Hiroshi Ohiwane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 12/320,255

(22) Filed: Jan. 22, 2009

(65) Prior Publication Data

US 2009/0280811 A1    Nov. 12, 2009

(30) Foreign Application Priority Data

May 7, 2008 (JP) ................................. 2008-121627

(51) Int. Cl.
*H04W 36/00* (2009.01)
(52) U.S. Cl. ...... 455/436; 455/561; 455/446; 455/550.1
(58) Field of Classification Search .................. 455/436, 455/561, 446, 550.1, 422.1
See application file for complete search history.

(56) References Cited

U.S. PATENT DOCUMENTS

| | | | |
|---|---|---|---|
| 6,125,280 A | 9/2000 | Grandhi et al. | |
| 6,201,969 B1 | 3/2001 | Meier | |
| 2002/0164982 A1 | 11/2002 | Ikeda et al. | |
| 2003/0199269 A1* | 10/2003 | Tobe et al. | 455/422.1 |
| 2005/0099972 A1 | 5/2005 | Motegi et al. | |
| 2007/0093268 A1 | 4/2007 | Hosono et al. | |
| 2007/0173259 A1 | 7/2007 | Akihara | |
| 2009/0034453 A1 | 2/2009 | Motegi et al. | |
| 2009/0047968 A1* | 2/2009 | Gunnarsson et al. | 455/446 |

FOREIGN PATENT DOCUMENTS

| | | |
|---|---|---|
| JP | 11215552 | 8/1999 |
| JP | 11-331931 | 11/1999 |
| JP | 2000-013843 A | 1/2000 |
| JP | 2002209275 | 7/2002 |
| JP | 2005142967 | 6/2005 |
| JP | 2007116392 | 5/2007 |
| JP | 2007312037 | 11/2007 |
| WO | 2005125249 A1 | 12/2005 |

OTHER PUBLICATIONS

Extended European Search Report issued to 09151335.8-2414/ 2117268, dated Nov. 5, 2009.
Nokia: "Self-Configuration and Self-Optimization of Neighbor Cell Lists" 3GPP Draft; R3-061758, 3rd Generation Partnership Project (3GPP), Mobile Competence Centre; 650, Route Des Lucioles; F-06921 Sophia-Antipolis Cedex; France, vol. RAN WG3, no. Riga, Latvia; 20061101, Nov. 1, 2006, XP050160644 [retrieved on Nov. 1, 2006].

(Continued)

*Primary Examiner* — David Q Nguyen
(74) *Attorney, Agent, or Firm* — Smith, Gambrell & Russell, LLP

(57) ABSTRACT

A first base station apparatus, when newly installed, extracts cells of a second base station apparatus and its coverage cells neighboring them from neighboring cell information stored therein. The first base station apparatus notifies the second base station apparatus of the cells by a notification message. The second base station apparatus updates neighboring cell information stored therein based on the notification message. The first base station apparatus also sends a notification message to a third base station apparatus so that the third base station apparatus updates neighboring cell information stored therein.

14 Claims, 10 Drawing Sheets

OTHER PUBLICATIONS

Mitsubushi Electric: "R3-071239 From large lists of potential neighbour cells to self-optimised neighbour cell lists" 3GPP TSG SA WG5 and WG3 LTE Adhoc, Sophia-Antipolis, France, [Online] vol. R3-071239, Jun. 13, 2007, pp. 1-4, XP002506178. Retrieved from the Internet: URL:http://www.3gpp.org> [retrieved on Nov. 28, 2008].

3rd Generation Partnership Project et al: "Evolved Universal Terrestrial Radio Access Network (E-UTRAN); X2 application protocol (X2AP) (Release 8)" 3GPP TS 36.423 V8.4.0 (2008-12), Dec. 1, 2008, XP002544595 *p. 17-p. 22*.

Nokia Siemens Networks et al: "Solution(s) to the 36.902A s Automated Configuration of Physical Cell Identity Use Case" 3GPP Draft; R3-080812 (PHYID AUTOCONF), 3rd Generation Partnership Project (3GPP), Mobile Competence Centre; 650, Route Des Lucioles; F-06921 Sophia-Antipolis Cedex; France, vol. RAN WG3, no. Shenzhen, China; 20080326, Mar. 26, 2008, XP050164010 [retrieved on Mar. 26, 2008].

Motorola: "Exchange of eUTRAN neighbour information" 3GPP Draft; R3-081414, 3rd Generation Partnership Project (3GPP), Mobile Competence Centre; 650, Route Des Lucioles; F-06921 Sophia-Antipolis Cedex; France, vol. RAN WG3, no. Kansas City, USA; 20080430, Apr. 30, 2008, XP050164586 [retrieved on Apr. 30, 2008].

Japanese Office Action dated Jul. 24, 2012 received in Application No. 2008-121627.

* cited by examiner

FIG.3

| NEIGHBORING BASE STATION | CONNECTION INFORMATION |
|---|---|
| BASE STATION #2 | IP ADDRESS, ⋯ |
| ⋯ | ⋯ |

| CELL NO. | NEIGHBORING CELL |
|---|---|
| 0 | #1-1, #1-2, ⋯ |
| 1 | #1-0, #1-2, #2-0, ⋯ |
| 2 | #1-0, #1-1, #2-1, ⋯ |
| ⋯ | ⋯ |

| CELL NO. | CELL INFORMATION |
|---|---|
| 0 | TRANSPORT INFORMATION, MEASUREMENT INFORMATION, ⋯ |
| 1 | TRANSPORT INFORMATION, MEASUREMENT INFORMATION, ⋯ |
| 2 | TRANSPORT INFORMATION, MEASUREMENT INFORMATION, ⋯ |
| ⋯ | ⋯ |

| CELL NO. | CELL INFORMATION |
|---|---|
| #2-0 | TRANSPORT INFORMATION, MEASUREMENT INFORMATION, ··· |
| #2-1 | TRANSPORT INFORMATION, MEASUREMENT INFORMATION, ··· |
| #2-2 | TRANSPORT INFORMATION, MEASUREMENT INFORMATION, ··· |
| ... | ... |

| NUMBER OF OBJECTIVE CELLS | | | |
|---|---|---|---|
| OBJECTIVE CELL LIST (1) | OBJECTIVE CELL NUMBER | | |
| | NUMBER OF NEIGHBORING CELL LISTS | | |
| | NEIGHBORING CELL LIST (1) | NEIGHBORING CELL NUMBER | |
| | | CELL NUMBER | |
| | ... | | |
| | NEIGHBORING CELL LIST (m1) | NEIGHBORING CELL NUMBER | |
| | | CELL NUMBER | |
| ... | | | |
| OBJECTIVE CELL LIST (n) | OBJECTIVE CELL NUMBER | | |
| | NUMBER OF NEIGHBORING CELL LISTS | | |
| | NEIGHBORING CELL LIST (1) | NEIGHBORING CELL NUMBER | |
| | | CELL NUMBER | |
| | ... | | |
| | NEIGHBORING CELL LIST (m2) | NEIGHBORING CELL NUMBER | |
| | | CELL NUMBER | |

FIG.8

| | | |
|---|---|---|
| NUMBER OF OBJECTIVE CELLS | | 2 |
| OBJECTIVE CELL LIST (1) | OBJECTIVE CELL NUMBER | #1-0 |
| | NUMBER OF NEIGHBORING CELL LISTS | 1 |
| | NEIGHBORING CELL LIST (1) | NEIGHBORING CELL NUMBER | #3-0 |
| | | CELL NUMBER | TRANSPORT INFORMATION, MEASUREMENT INFORMATION, ... |
| OBJECTIVE CELL LIST (2) | OBJECTIVE CELL NUMBER | #1-1 |
| | NUMBER OF NEIGHBORING CELL LISTS | 2 |
| | NEIGHBORING CELL LIST (1) | NEIGHBORING CELL NUMBER | #3-0 |
| | | CELL NUMBER | TRANSPORT INFORMATION, MEASUREMENT INFORMATION, ... |
| | NEIGHBORING CELL LIST (2) | NEIGHBORING CELL NUMBER | #3-1 |
| | | CELL NUMBER | TRANSPORT INFORMATION, MEASUREMENT INFORMATION, ... |

21

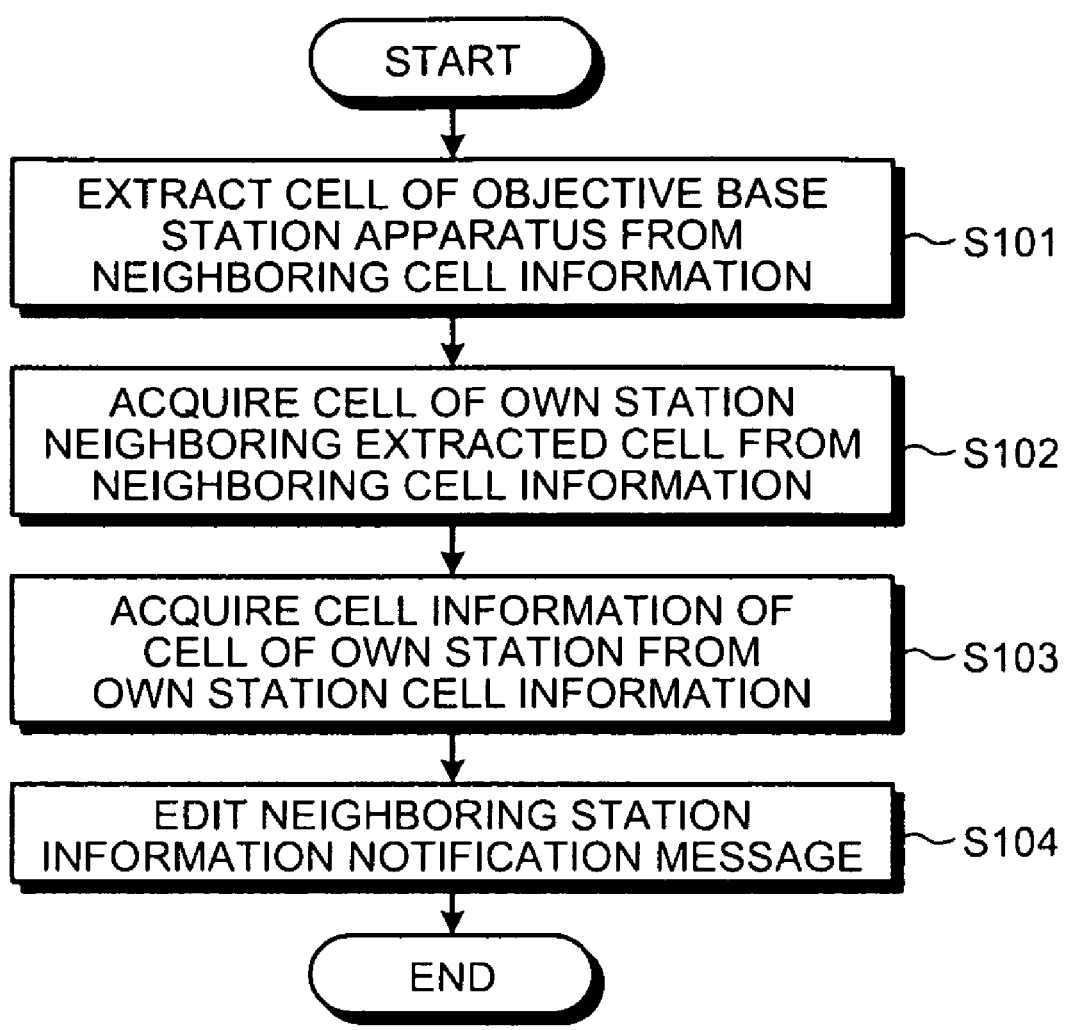

BASE STATION APPARATUS AND NEIGHBORING CELL INFORMATION MANAGEMENT METHOD

CROSS-REFERENCE TO RELATED APPLICATIONS

This application is based upon and claims the benefit of priority of the prior Japanese Patent Application No. 2008-121627, filed on May 7, 2008, the entire contents of which are incorporated herein by reference.

BACKGROUND

1. Field

The embodiment(s) discussed herein is (are) directed to a technology for managing neighboring cell information.

2. Description of the Related Art

Mobile wireless communication, in which a plurality of cells form, in combination, a communication area, needs a process called "handover", so that communication is not to be disconnected even when a mobile machine such as a mobile phone moves from one cell to the other. To perform handover, a base station apparatus notifies a mobile machine in its coverage cell of cells neighboring the coverage cell as neighboring cells. The mobile machine notifies the base station apparatus of the receiving state of electric wave from the neighboring cells. When there is a cell in such a receiving state that satisfies a predetermined condition, the base station apparatus determines the cell as a destination of handover.

To realize such a structure, the base station apparatus stores neighboring cell information (NCL: Neighboring Cell List) for each of cells that the apparatus accommodate. Around the cell, there may be a cell accommodated by other base station, and in such a case, a cell accommodated by other base station is included as part of neighboring cell information.

As described above, including a cell covered by another base station in neighboring cell information necessitates review of neighboring cell information of a neighboring base station apparatus when a new base station is additionally provided, or when a cell is added to an existing base station, leading the increase in number of steps of maintenance and management of neighboring cells. For example, in the case where a cell a is added in the base station apparatus A, when the cell a neighbors a cell b of a base station apparatus B, not only information of cells around the cell a should be set in the base station apparatus A as neighboring cell information, but also neighboring cell information of the base station apparatus B should be updated so that the cell a is included as neighboring cells of the cell b.

For the purpose of reducing the number of steps of maintenance and management of neighboring cell information, such a technique is proposed that a mobile exchange center (MCS) which is a higher level apparatus of the base station apparatus controls collection of information, determines the neighboring condition of cell, and instructs the base station apparatus to update neighboring cell information. Also proposed is a technique of updating neighboring cell information by exchanging information between base station apparatuses based on information sent by a mobile machine to the base station apparatus at the time of executing handover. Reference may be had to, for example, Japanese Laid-open Patent Publication Nos. H11-331931 and 2000-13843

However, the method of determining neighboring condition of cell by a higher level apparatus such as a mobile exchange center has a problem that great burden is imposed on the higher level apparatus when a cell is added in plural base station apparatuses. Further, the method of exchanging information between base station apparatuses based on information sent from a mobile machine has a problem that line is stressed as the number of mobile machines increases, and information exchanged between the base station apparatuses increases.

SUMMARY

According to an aspect of an embodiment, a base station apparatus includes: a neighboring cell information storage unit that stores a list of cells that neighbor each of coverage cells; and a notifying unit that extracts, from the neighboring cell information storage unit, a combination of a cell of a predetermined base station apparatus and a coverage cell of the base station apparatus neighboring the cell of the predetermined base station apparatus, creates a notification message including the combination, and sends the notification message to the predetermined base station apparatus.

According to another aspect of an embodiment, a base station apparatus includes: a neighboring cell information storage unit that stores a list of cells that neighbor each of coverage cells of the base station apparatus; and a neighboring cell information updating unit that, upon receipt from other base station apparatus of a notification message including a combination of a cell of the other base station apparatus and a coverage cell of the base station apparatus neighboring the cell of the other base station apparatus, stores the combination, if not present in the neighboring cell information storage unit, in the neighboring cell information storage unit.

According to another aspect of an embodiment, a neighboring cell information management method includes: a first base station apparatus storing, as first neighboring cell information, a list of cells that neighbor each of first coverage cells of the first base station apparatus; a second base station apparatus storing, as second neighboring cell information, a list of cells that neighbor each of second coverage cells of the second base station apparatus; the first base station apparatus extracting, from the first neighboring cell information, a combination of a second coverage cell and a first coverage cell neighboring the second coverage cell; the first base station apparatus creating a notification message including the combination to send the notification message to the second base station apparatus; and the second base station apparatus storing, upon receipt of the notification message, the combination, if not present in the second neighboring cell information, to update the second neighboring cell information.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3 is an example of data structure of neighboring base station information;

FIG. 4 is an example of data structure of neighboring cell information;

FIG. 5 is an example of data structure of own cell information;

FIG. 6 is an example of data structure of neighboring station cell information;

FIG. 7 is an example of format of a neighboring station information notification message;

FIG. 8 is an example of a neighboring station information notification message;

FIG. 9 is an example flowchart of the process of creating a neighboring station information notification message;

DETAILED DESCRIPTION OF THE PREFERRED EMBODIMENTS

Exemplary embodiments of the present invention will be described in detail below with reference to the accompanying drawings.

Figure 1:
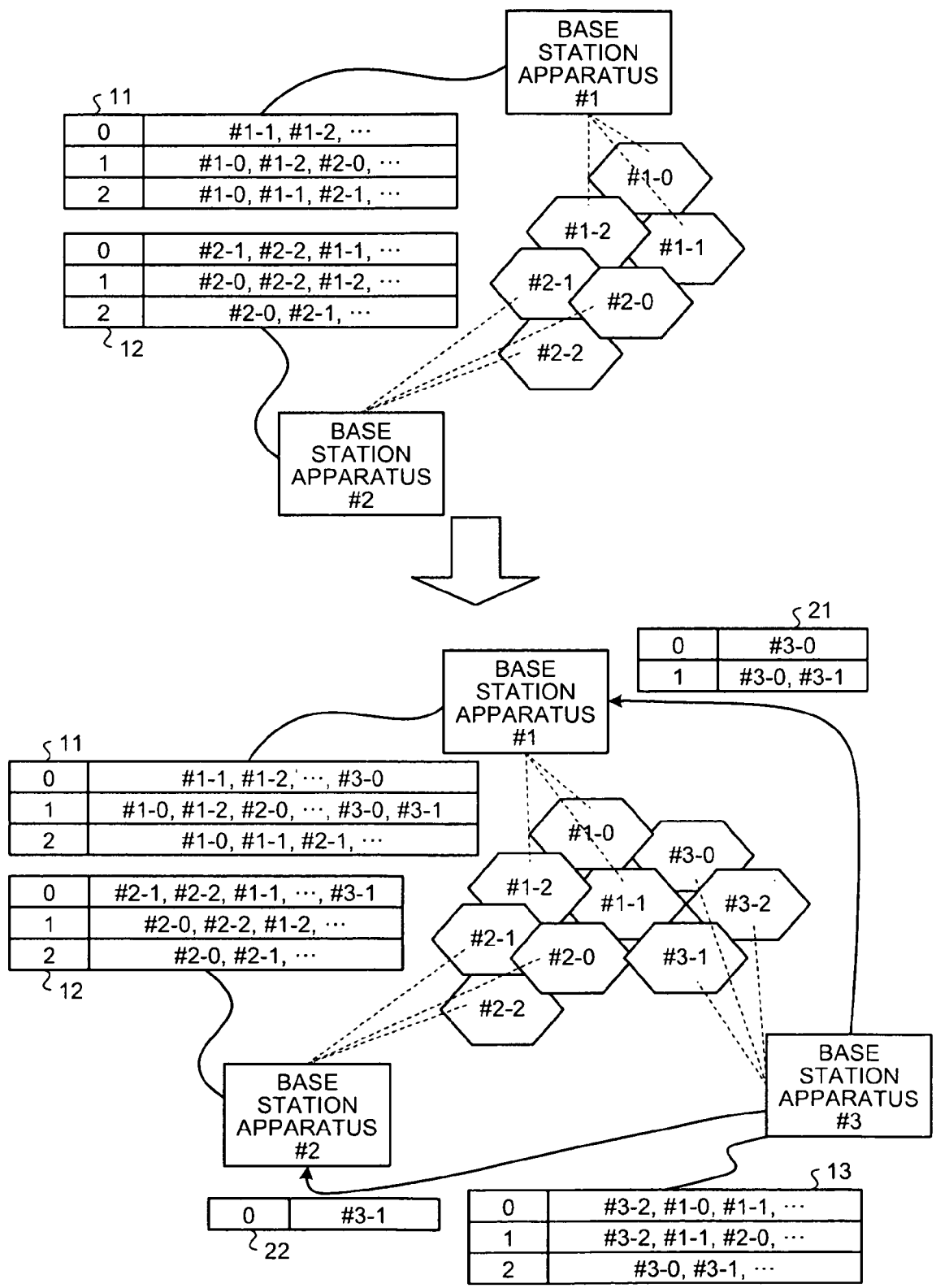
FIG. 1 is an example schematic diagram for explaining outline of a neighboring cell information updating method according to an embodiment.

First, a method of updating neighboring cell information according to an embodiment will be explained. FIG. 1 is a schematic diagram for explaining general outline of a method of updating neighboring cell information according to the embodiment. FIG. 1 illustrates how the neighboring cell information is updated when a base station apparatus #3 is newly added where a base station apparatus #1 and a base station apparatus #2 neighbor each other. In the following, when a cell is designated by a reference character as #x-y, x indicates an identification number of the base station apparatus and y denotes an identification number of the cell set for the base station apparatus.

The base station apparatus #1 covers cells #1-0 to #1-2. The cells #1-0 to #1-2 neighbor each other, the cell #1-1 also neighbors a cell #2-0, and the cell #1-2 also neighbors the a cell #2-1. Therefore, before addition of the base station apparatus #3, neighboring cell information 11 of the base station apparatus #1 has such a settings that there are the cell #1-1 and the cell #1-2 near the cell of identification number 0, there are the cell #2-0 in addition to the cell #1-0 and the cell #1-2 near the cell of identification number 1, and there are the cell #2-1 in addition to the cell #1-0 and the cell #1-1 near the cell of identification number 2.

The base station apparatus #2 covers cells #2-0 to #2-2. The cells #2-0 to #2-2 neighbor each other, the cell #2-0 also neighbors the cell #1-1, and the cell #2-1 also neighbors the cell #1-2. Therefore, before addition of the base station apparatus #3, neighboring cell information 12 of the base station apparatus #2 has such a settings that there are the cell #1-1 in addition to the cell #2-1 and the cell #2-2 near the cell of identification number 0, there are the cell #1-2 in addition to the cell #2-0 and the cell #2-2 near the cell of identification number 1, and there are the cell #2-0 and the cell #2-1 near the cell of identification number 2.

Here, when the base station apparatus #3 is provided, neighboring cell information 13 is set in the base station apparatus #3 by a conventional procedure. The base station apparatus #3 covers cells #3-0 to #3-2, the cell #3-0 neighbors the cell #3-2, the cell #1-0 and the cell #1-1, the cell #3-1 neighbors the cell #3-2, the cell #1-1 and the cell #2-0, and the cell #3-2 neighbors the cell #3-0 and the cell #3-1. Therefore, the neighboring cell information 13 of the base station apparatus #3 has such a settings that there are the cell #3-2, the cell #1-0 and the cell #1-1 near the cell of identification number 0, there are the cell #3-2, the cell #1-1 and the cell #2-0 near the cell of identification number 1, and there are the cell #3-0 and the cell #3-1 near the cell of identification number 2.

Upon recognition of the base station apparatus #1 after startup, the base station apparatus #3 extracts from the neighboring cell information 13, information about a cell of own station neighboring the cell accommodated in the base station apparatus #1, and notifies the base station apparatus #1 of the extracted information as a neighboring station information notification message 21. In the case of this example, it can be seen that the cell of identification number 0 neighbors the cell #1-0 and the cell #1-1, and the cell of identification number #1 neighbors the cell #1-1 by referring to the neighboring cell information 13. Accordingly, the base station apparatus #3 notifies the base station apparatus #1 that the cell of identification number 0 neighbors the cell #3-0 and that the cell of identification number 1 neighbors the cell #3-0 and the cell #3-1, as the neighboring station information notification message 21.

Upon receipt of the neighboring station information notification message 21, the base station apparatus #1 compares the information set therein with the neighboring cell information 11, and registers unregistered information about cell, if any, into the neighboring cell information 11. In the case of this example, the information relating that the cell of identification number 0 neighbors the cell #3-0 and the information relating that the cell of identification number 1 neighbors the cell #3-0 and the cell #3-1 are registered in the neighboring cell information 11.

Further, upon recognition of the base station apparatus #2 after startup, the base station apparatus #3 extracts from the neighboring cell information 13, information about a cell of own station neighboring the cell accommodated in the base station apparatus #2, and notifies the base station apparatus #2 of the extracted information as a neighboring station information notification message 22. In the case of this example, it can be seen that the cell of identification number 1 neighbors the cell #2-0 by referring to the neighboring cell information 13. Accordingly, the base station apparatus #3 notifies the base station apparatus #2 that the cell of identification number 0 neighbors the cell #3-1, as the neighboring station information notification message 22.

Upon receipt of the neighboring station information notification message 22, the base station apparatus #2 compares the information set therein with the neighboring cell information 12, and registers unregistered cell information, if any, in the neighboring cell information 12. In the case of this example, the information relating that the cell of identification number 0 neighbors the cell #3-1 is registered in the neighboring cell information 12.

As described above, according to the embodiment, the base station apparatus extracts information of a cell of own station neighboring the cell of the neighboring base station apparatus and sends the information to the neighboring base station apparatus, whereby neighboring cell information of a neighboring base station apparatus is updated. According to this method, by properly setting neighboring cell information of a newly added base station apparatus, or a base station apparatus in which cell is added, neighboring cell information of other neighboring base station apparatuses is automatically updated, so that it is possible to greatly reduce the number of steps required for maintenance and management of neighboring cell information.

According to the above method, since it is not necessary for a higher level apparatus to conduct special control in updating of the neighboring cell information, it is possible to prevent the burden on the higher level apparatus from increasing. Further, according to the present method, since update of the neighboring cell information is not executed based on information sent from a mobile machine, the line will not be stressed with increased number of mobile machines.

FIG. 1 illustrates the case where a base station apparatus is additionally installed; however, also when a cell is added to coverage cells of an existing base station apparatus, for example, triggered by a change in neighboring cell information of the existing base station apparatus, a neighboring station information notification message is sent/received between base station apparatuses. Thus, neighboring cell information of the neighboring base station apparatus is automatically updated.

Figure 2:
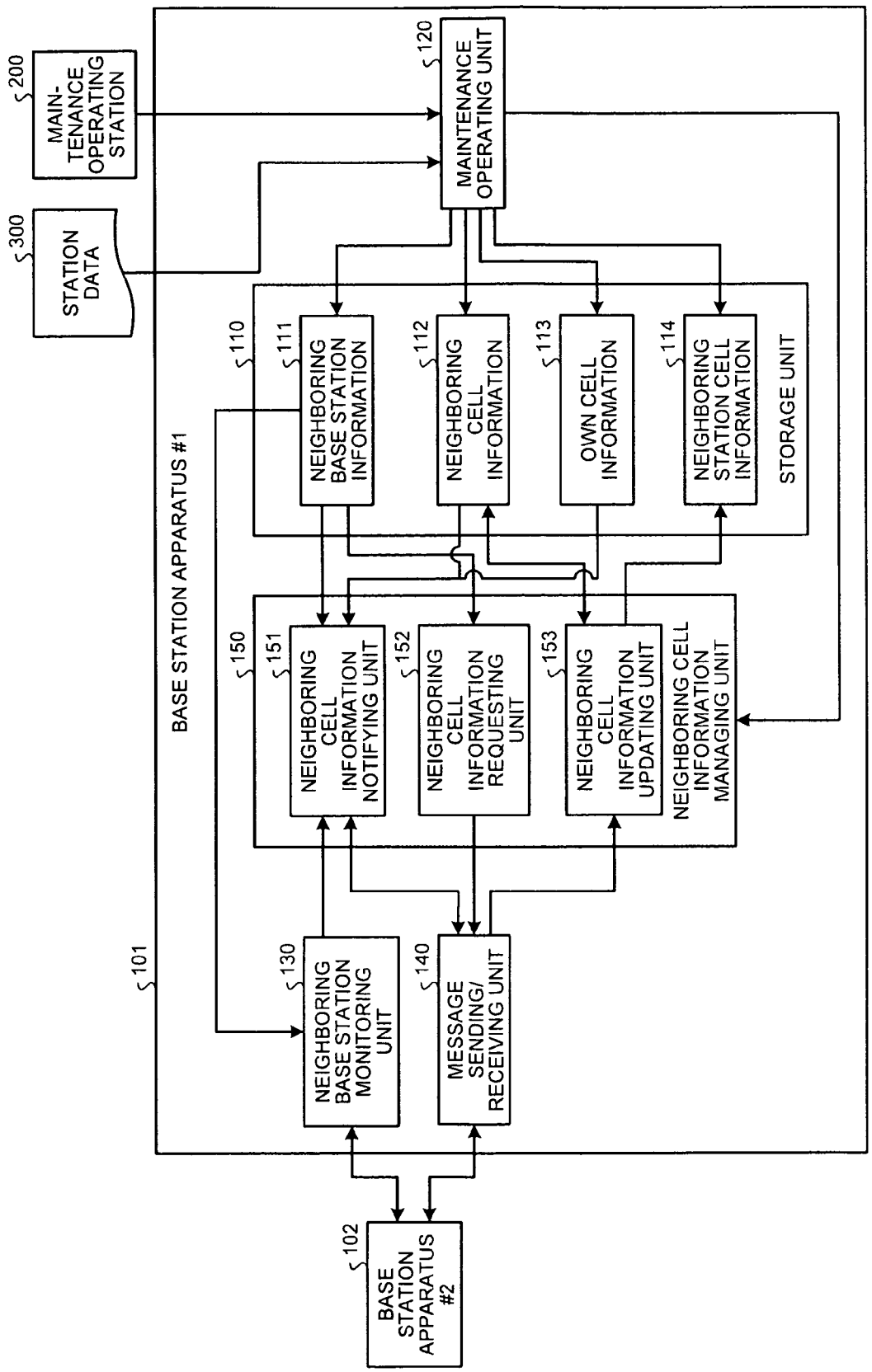
FIG. 2 is an example functional block diagram of a base station apparatus according to the embodiment.

Described below is a configuration of a base station apparatus to which is applied the method of updating neighboring cell information according to the embodiment. FIG. 2 is a functional block diagram of a base station apparatus 101 to which is applied the method of updating neighboring cell information according to the embodiment. For simplicity, FIG. 2 illustrates only the configuration involved in updating of neighboring cell information.

The base station apparatus 101 corresponds to the base station apparatus #1 in FIG. 1, and includes a storage unit 110, a maintenance operating unit 120, a neighboring base station monitoring unit 130, a message sending/receiving unit 140, and a neighboring cell information managing unit 150. The base station apparatus #2 and the base station apparatus #3 depicted in FIG. 1 also have a similar configuration as the base station apparatus 101.

The storage unit 110 stores various information including neighboring base station information 111, neighboring cell information 112, own cell information 113, and neighboring station cell information 114. The neighboring base station information 111, the neighboring cell information 112, the own cell information 113 and the neighboring station cell information 114 may be respectively stored in separate storage units.

The neighboring base station information 111 is information on all neighboring base station apparatuses. Data structure of the neighboring base station information 111 is depicted in FIG. 3. As depicted in FIG. 3, in the neighboring base station information 111, information required for connection such as IP address is registered in correspondence with an identifier of each neighboring base station apparatus.

The neighboring cell information 112 is information on a list of cells near each cell of the own station. One example of data structure of the neighboring cell information 112 is depicted in FIG. 4. The first line of the neighboring cell information 112 in this example indicates that there are the cell #1-1 and the cell #1-2 near the cell of identification number 0 of own station, the second line indicates that there are the cell #1-0, the cell #1-2 and the cell #2-0 near the cell of identification number 1 of own station, and the third line indicates that there are the cell #1-0, the cell #1-1 and the cell #2-1 near the identification number 2 of own station.

The own cell information 113 is information concerning cells of the own station. One example of data structure of the own cell information 113 is depicted in FIG. 5. As depicted in FIG. 5, in the own cell information 113, cell information which is information required for handover control and the like such as transport information and measurement information are registered in correspondence with an identification number of cell of the own station.

The neighboring station cell information 114 is information concerning cells of other base station apparatus neighboring a cell of the own station. One example of data structure of the neighboring station cell information 114 is depicted in FIG. 6. As depicted in FIG. 6, in the neighboring station cell information 114, cell information which is information required for handover control and the like such as transport information and measurement information are registered in correspondence with an identification number of cell of the neighboring other base station apparatus.

The maintenance operating unit 120 updates various information stored in the storage unit 110 according to a command sent from a maintenance operating station 200 or station data 300 input to the base station apparatus 101. When the neighboring cell information 112 is updated, the maintenance operating unit 120 notifies the neighboring cell information managing unit 150 of the fact.

The neighboring base station monitoring unit 130 monitors each of the base station apparatuses registered in the neighboring base station information 111, as an object to be monitored, via a line for exchanging control information between base station apparatuses. When a base station apparatus which is an object to be monitored is newly detected, the neighboring base station monitoring unit 130 notifies a neighboring cell information notifying unit 151 of the neighboring cell information managing unit 150 of the detection.

Upon receipt of notification from the neighboring base station monitoring unit 130, the neighboring cell information notifying unit 151 extracts a cell of own station neighboring the cell of the newly detected base station apparatus from the neighboring cell information 112, and creates a neighboring station information notification message, and sends the created neighboring station information notification message to the newly detected base station apparatus. In this manner, by sending the neighboring station information notification message triggered by newly detecting a base station apparatus, it is possible to automatically update neighboring cell information of the base station apparatus neighboring at the time of addition of the base station apparatus.

The message sending/receiving unit 140 sends/receives various messages concerning update of neighboring cell information to/from the base station apparatus 102 and the like corresponding to the base station apparatus #2 depicted in FIG. 1. For example, the message sending/receiving unit 140 sends a neighboring station information notification message created by the neighboring cell information notifying unit 151 to a designated base station apparatus. Further, when receiving a neighboring station information notification message from other base station apparatus, the message sending/receiving unit 140 transfers the neighboring station information notification message to a neighboring cell information updating unit 153 of the neighboring cell information managing unit 150 to make the same update the neighboring cell information 112.

The neighboring cell information managing unit 150 manages the neighboring cell information 112, and includes the neighboring cell information notifying unit 151, a neighboring cell information requesting unit 152, and the neighboring cell information updating unit 153. Upon receiving notification concerning detection of a new base station apparatus from the neighboring base station monitoring unit 130 as described above, the neighboring cell information notifying unit 151 extracts a cell of own station neighboring the cell of the base station apparatus from the neighboring cell information 112 and creates a neighboring station information notification message.

Upon receipt of notification relating that the neighboring cell information 112 is updated from the maintenance operating unit 120, the neighboring cell information notifying unit 151 creates a neighboring station information notification message for each of the base station apparatuses registered in the neighboring base station information 111, and sends each created neighboring station information notification message to a corresponding base station apparatus. In this manner, by sending the neighboring station information notification messages to every neighboring base station apparatus, triggered by update of the neighboring cell information 112, it is possible to automatically reflect the update content of the neighboring cell information 112 in the own station to other base station apparatuses.

When the message sending/receiving unit 140 receives a neighboring station information request message that requests for the neighboring station information notification message, the neighboring cell information notifying unit 151 extracts a cell of own station neighboring the cell of the base station apparatus from which the message is sent, from the neighboring cell information 112, and creates a neighboring station information notification message, and sends the created neighboring station information notification message to the base station apparatus from which the neighboring station information request message is sent. In this manner, by sending the neighboring station information notification message in correspondence with the neighboring station information request message, it is possible to automatically update the neighboring cell information 112 at desired timing.

One example of format of the neighboring station information notification message is depicted in FIG. 7. In this example, the neighboring station information notification message contains a number of objective cells, and objective cell lists for the number of objective cells. Each objective cell list contains an objective cell number which is an identification number of cell in the base station apparatus from which the message is sent, and a number of neighboring cell lists which is a number of cells in the own station neighboring the cell, and neighboring cell lists for the number of neighboring cell lists. Each neighboring cell list contains a neighboring cell number which is an identification number of cell of own station neighboring the cell set as an objective cell, and cell information such as transport information, measurement information required for control of the cell of own station.

A concrete example of the neighboring station information notification message is depicted in FIG. 8. FIG. 8 illustrates the neighboring station information notification message 21 in FIG. 1 more specifically. Here, not only the identification number of a cell of own station but also the cell information is sent, because merely identification number of cell does not suffice, and transport information, measurement information and the like are required in order to control the handover.

The neighboring cell information requesting unit 152 creates a neighboring station information request message, and sends it to other base station apparatus. For example, when receiving the notification relating that the neighboring cell information 112 is updated from the maintenance operating unit 120, the neighboring cell information requesting unit 152 creates a neighboring station information request message for each of the base station apparatuses registered in the neighboring base station information 111, and sends each of the created neighboring station information request messages to a corresponding base station apparatus. In this manner, by sending the neighboring station information request messages to all of the neighboring base station apparatuses, triggered by update of the neighboring cell information 112, even if a part of the neighboring cell information is erroneously deleted, for example, by a command from the maintenance operating station 200, the neighboring cell information 112 is appropriately repaired based on the neighboring station information notification message sent from other base station apparatus.

The neighboring cell information updating unit 153 updates the neighboring cell information 112 and the neighboring station cell information 114 based on the neighboring station information notification message received in the message sending/receiving unit 140. Concretely, the neighboring cell information updating unit 153 extracts combination of a cell of own station and a cell of sending end from the neighboring station information notification message, and registers a combination that is not registered in the neighboring cell information 112, if any, and registers cell information corresponding the combination in the neighboring station cell information 114.

Described below is the operation of the neighboring cell information managing unit 150 depicted in FIG. 2. FIG. 9 is a flowchart of the process of creating a neighboring station information notification message performed by the neighboring cell information notifying unit 151. As depicted in FIG. 9, the neighboring cell information notifying unit 151 extracts a cell of objective base station apparatus from the neighboring cell information 112 (Step S101), and acquires a cell of own station neighboring the extracted cell from the neighboring cell information 112 (Step S102). The neighboring cell information notifying unit 151 then acquires cell information of the acquired cell of own station from the own cell information 113 (Step S103), and edits the neighboring station information notification message based on the information (Step S104).

Figure 10:
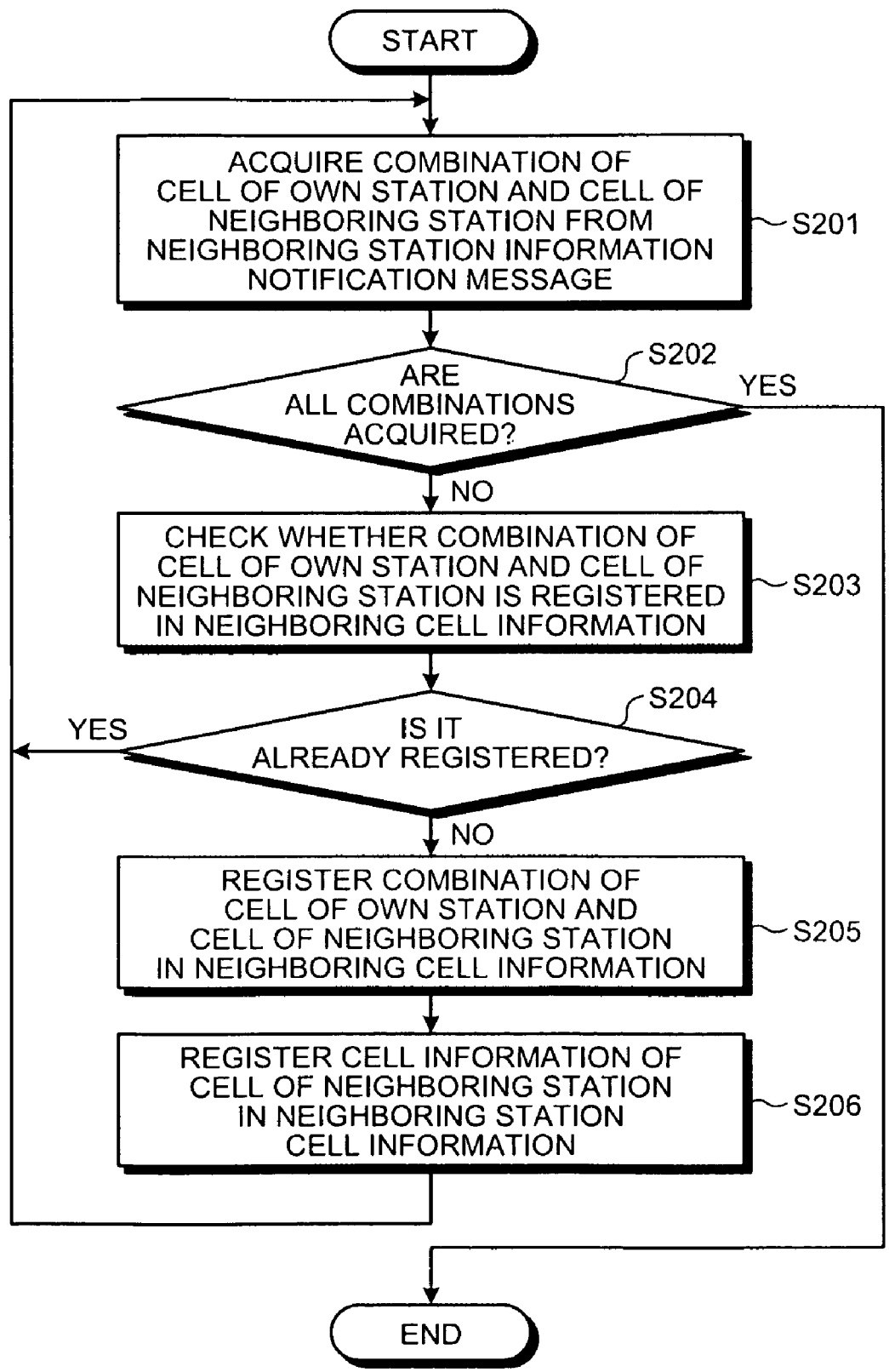
FIG. 10 is an example flowchart of the process of updating a neighboring cell information.

FIG. 10 is a flowchart of the process of updating neighboring cell information performed by the neighboring cell information updating unit 153. As depicted in FIG. 10, the neighboring cell information updating unit 153 acquires a combination of a cell of own station and a cell of neighboring station from the received neighboring station information notification message (Step S201). When a combination of a cell of own station and a cell of neighboring station is acquired (No at Step S202), the neighboring cell information updating unit 153 checks whether the combination is registered in the neighboring cell information 112 (Step S203).

When it is not registered in the neighboring cell information 112 (No at Step S204), the neighboring cell information updating unit 153 registers the combination in the neighboring cell information 112 (Step S205), and further registers cell information, which is set in the neighboring station information notification message in correspondence with the cell of neighboring station contained in the combination, in the neighboring station cell information 114 (Step S206). On the other hand, when it is already registered in the neighboring cell information 112 (Yes at Step S204), updating of the neighboring cell information 112 and the neighboring station cell information 114 is not conducted.

The above process is repeated, and, on completion of updating all combinations of a cell of own station and a cell of neighboring station from the received neighboring station information notification message (Yes at Step S202), the process of updating neighboring cell information ends.

Figure 11:
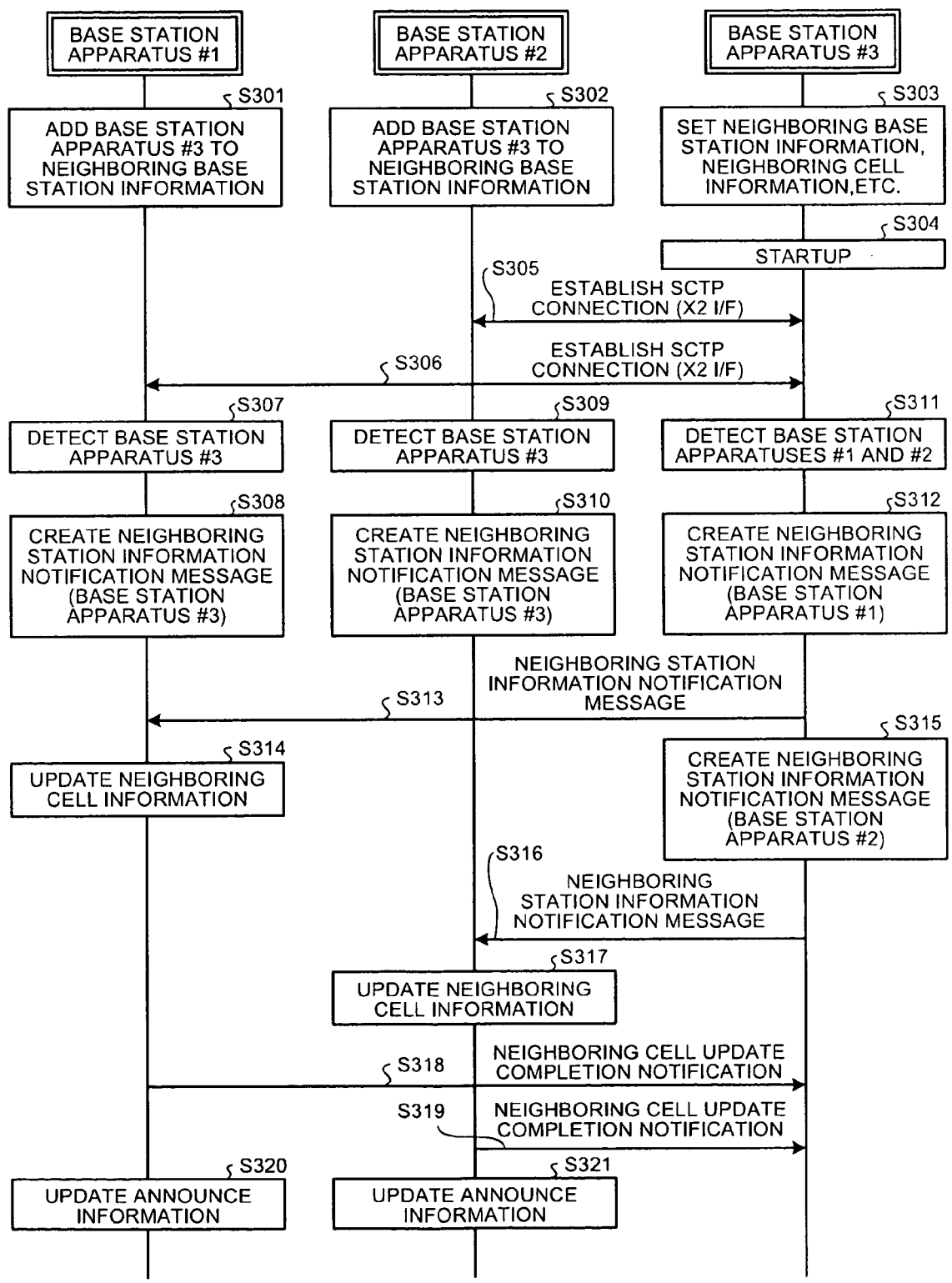
FIG. 11 is an example sequence chart of the operation performed when a base station apparatus #3 is additionally installed.

Next, information exchange between base station apparatuses will be explained by way of concrete examples. FIG. 11 is a sequence chart of the operation performed when the base station apparatus #3 is newly added where the base station apparatus #1 and the base station apparatus #2 neighbor each other.

In adding the base station apparatus #3, in formation of the base station apparatus #3 is registered in the neighboring base station information 111 of the base station apparatus #1 and the base station apparatus #2 by a command or the like sent from the maintenance operating station 200 (Step S301, Step S302). Also by input of station data 300 and on the like, the neighboring base station information 111, the neighboring cell information 112, the own cell information 113 and the neighboring station cell information 114 are stored in the storage unit 110 of the base station apparatus #3 (Step S303). In the information, information concerning the base station apparatus #1 and the base station apparatus #2 are appropriately set in advance.

Upon startup of the base station apparatus #3 (Step S304), Stream Control Transmission Protocol (SCTP) connection is established via X2 interface between the base station apparatus #1 and the base station apparatus #3, and between the base station apparatus #2 and the base station apparatus #3 (Step S305, Step S306).

By establishment of the SCTP connection, the base station apparatus #3 is detected in the neighboring base station monitoring unit 130 of the base station apparatus #1 (Step S307), and the neighboring cell information notifying unit 151 creates, triggered by notification from the neighboring base station monitoring unit 130, a neighboring station information notification message for the base station apparatus #3 (Step S308). At this point, however, since information concerning cells of the base station apparatus #3 is not contained in the neighboring cell information 112, a neighboring station information notification message is not created.

Similarly, by establishment of the SCTP connection, the base station apparatus #3 is detected in the neighboring base station monitoring unit 130 of the base station apparatus #2 (Step S309), and the neighboring cell information notifying unit 151 creates, triggered by notification from the neighboring base station monitoring unit 130, a neighboring station information notification message for the base station apparatus #3 (Step S310). At this point, however, since information concerning cells of the base station apparatus #3 is not contained in the neighboring cell information 112, a neighboring station information notification message is not created.

By establishment of the SCTP connection, the base station apparatus #1 and the base station apparatus #2 is detected in the neighboring base station monitoring unit 130 of the base station apparatus #3 (Step S311). Then, triggered by notification of detection of the base station apparatus #1 from the neighboring base station monitoring unit 130, the neighboring cell information notifying unit 151 creates a neighboring station information notification message for the base station apparatus #1 (Step S312). Since the neighboring cell information 112 of the base station apparatus #3 contains information concerning cells of the base station apparatus #1, the neighboring station information notification message is normally created, and sent to the base station apparatus #1 (Step S313). The neighboring cell information updating unit 153 of the base station apparatus #1 updates the neighboring cell information, and information concerning cells of the base station apparatus #3 is registered in the neighboring cell information 112 and in the neighboring station cell information 114 (Step S314).

Similarly, triggered by notification of detection of the base station apparatus #2 from the neighboring base station monitoring unit 130, the neighboring cell information notifying unit 151 creates a neighboring station information notification message for the base station apparatus #2 (Step S315). Since the neighboring cell information 112 of the base station apparatus #3 contains information concerning cells of the base station apparatus #2, the neighboring station information notification message is normally created, and sent to the base station apparatus #2 (Step S316). The neighboring cell information updating unit 153 of the base station apparatus #2 updates the neighboring cell information, and information concerning cells of the base station apparatus #3 is registered in the neighboring cell information 112 and in the neighboring station cell information 114 (Step S317).

The base station apparatus #1 and the base station apparatus #2 send the base station apparatus #3 a neighboring cell update completion notification indicating that the neighboring cell information has properly been updated as a reply (Step S318, Step S319). Thereafter, the base station apparatus #1 and the base station apparatus #2 update the information of neighboring cells that is announced to mobile machines present in cells of own station as necessary (Step S320, Step S321).

Figure 12:
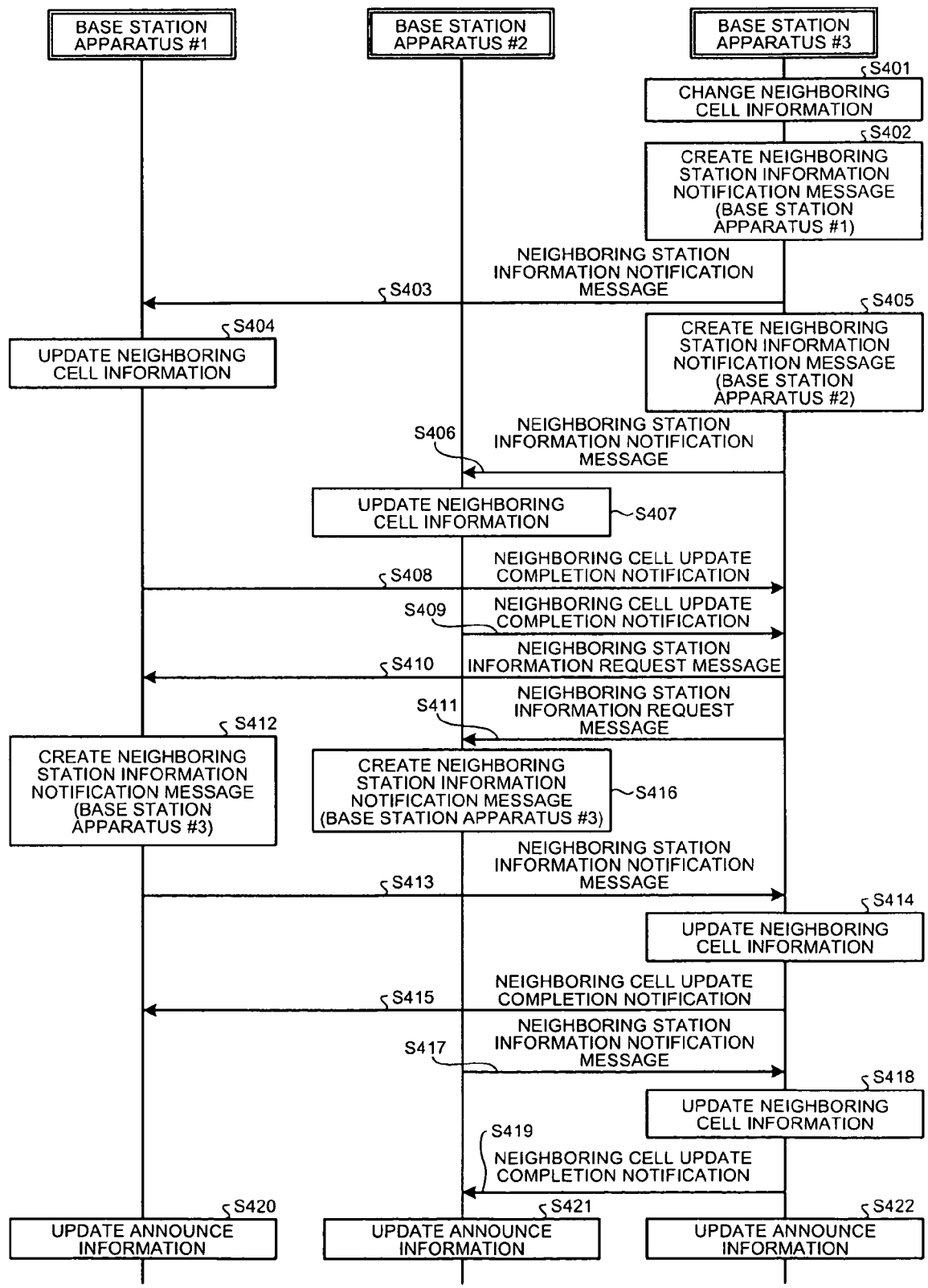
FIG. 12 is an example sequence chart of the operation performed when neighboring cell information of the base station apparatus #3 is changed.

FIG. 12 is a sequence chart of the operation performed when neighboring cell information of the base station apparatus #3 is changed. It is assumed herein that, in the neighboring base station information 111 of the base station apparatus #3, only information of the base station apparatus #1 and the base station apparatus #2 is registered.

When the neighboring cell information 112 of the base station apparatus #3 is changed by a command sent from the maintenance operating station 200 or the input station data 300 (Step S401), the neighboring cell information notifying unit 151 first creates, triggered by notification of the maintenance operating unit 120, a neighboring station information notification message for the base station apparatus #1 with reference to the neighboring base station information 111 (Step S402). The created neighboring station information notification message is sent to the base station apparatus #1 (Step S403). The neighboring cell information updating unit 153 of the base station apparatus #1 updates the neighboring cell information, and information concerning cells of the base station apparatus #3 is registered in the neighboring cell information 112 and in the neighboring station cell information 114 (Step S404).

Subsequently, the neighboring cell information notifying unit 151 creates a neighboring station information notification message for the base station apparatus #2 with reference to the neighboring base station information 111 (Step S405). The created neighboring station information notification message is sent to the base station apparatus #2 (Step S406). The neighboring cell information updating unit 153 of the base station apparatus #2 updates the neighboring cell information, and information concerning cells of the base station apparatus #3 is registered in the neighboring cell information 112 and in the neighboring station cell information 114 (Step S407).

The base station apparatus #1 and the base station apparatus #2 send the base station apparatus #3 a neighboring cell update completion notification indicating that the neighboring cell information has been properly updated as a reply (Step S408, Step S409).

The neighboring cell information requesting unit 152 creates a neighboring station information request message for the base station apparatus #1 and a neighboring station information request message for the base station apparatus #2, with reference to the neighboring base station information 111, triggered by notification of the maintenance operating unit 120, and sends these to the objective base station apparatuses (Step S410, Step S411).

The neighboring cell information notifying unit 151 of the base station apparatus #1 creates, triggered by receipt of the neighboring station information request message, a neighboring station information notification message for the base station apparatus #3 (Step S412), and sends the neighboring station information notification message to the base station apparatus #3 (Step S413). The neighboring cell information updating unit 153 of the base station apparatus #3 updates the neighboring cell information, and information concerning cells of the base station apparatus #1 is registered in the neighboring cell information 112 and in the neighboring station cell information 114 (Step S414). The base station apparatus #3 sends a neighboring cell update completion notification as a reply to the base station apparatus #1 (Step S415).

Similarly, the neighboring cell information notifying unit 151 of the base station apparatus #2 creates, triggered by receipt of the neighboring station information request message, a neighboring station information notification message for the base station apparatus #3 (Step S416), and sends the neighboring station information notification message to the base station apparatus #3 (Step S417). The neighboring cell information updating unit 153 of the base station apparatus #3 updates the neighboring cell information, and information concerning cells of the base station apparatus #2 is registered in the neighboring cell information 112 and in the neighboring station cell information 114 (Step S418). The base station apparatus #3 sends a neighboring cell update completion notification as a reply to the base station apparatus #2 (Step S419).

Thereafter, the base station apparatus #1, the base station apparatus #2 and the base station apparatus #3 update the information of neighboring cells that is announced to mobile machines present in cells of own station as necessary (Step S420, Step S421, Step S422).

The configuration of the base station apparatus 101 depicted in FIG. 2 may be modified in various ways without departing from the scope of the invention. For example, the neighboring cell information managing unit 150 may be implemented as software. In other words, a computer program (hereinafter, "neighboring cell information management program") may be executed by a central processing unit (CPU) on a computer to realize the same function as the neighboring cell information managing unit 150 in the base station apparatus 101. In the following, such a computer is explained. Described below is one example of a base station apparatus in which the function of the neighboring cell information managing unit 150 is implemented as software.

Figure 13:
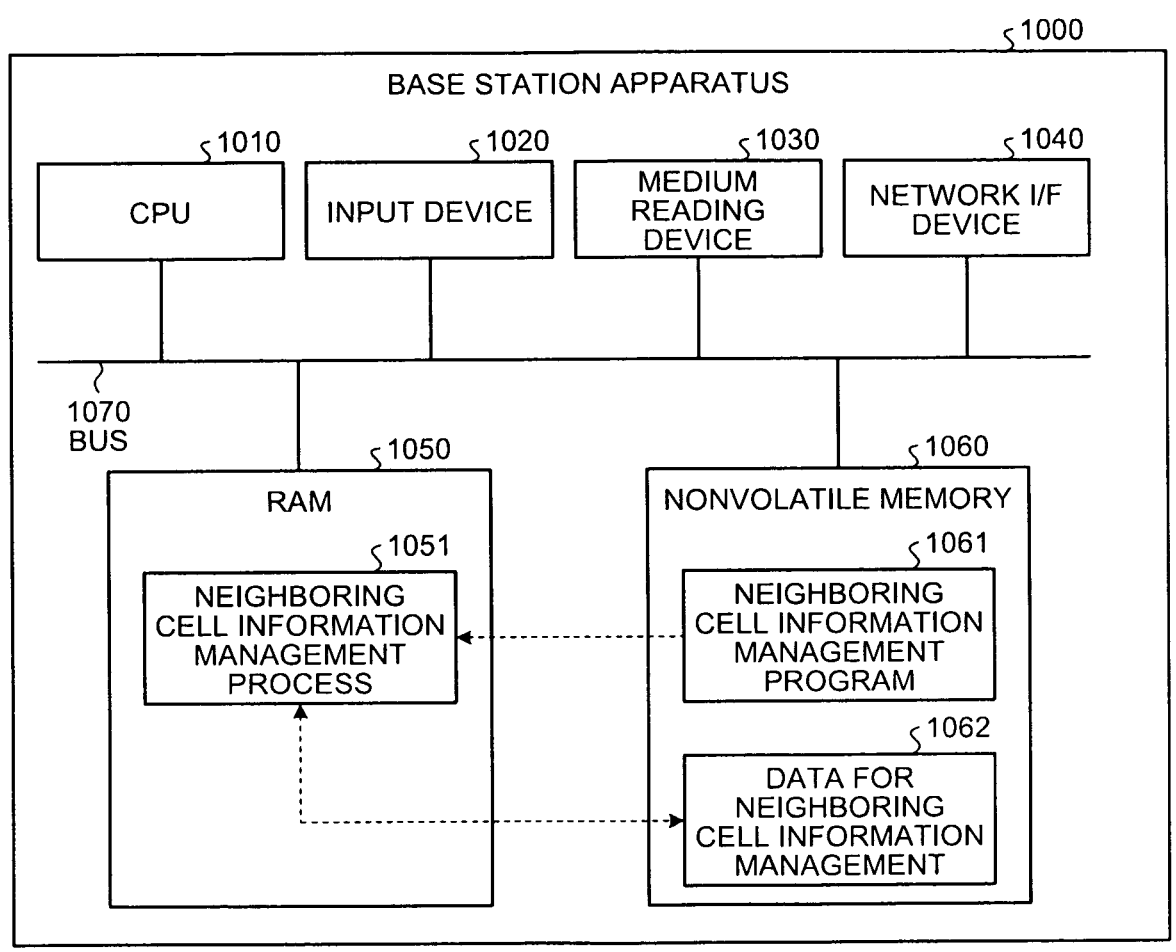
FIG. 13 is an example functional block diagram of a base station apparatus that execute a neighboring cell information management program.

FIG. 13 is a functional block diagram of a base station apparatus 1000 on which is executed a neighboring cell information management program 1061. The base station apparatus 1000 depicted in FIG. 13 includes a CPU 1010 that performs various arithmetic processes, an input device 1020 that receives data input from a maintenance staff or the like, a medium reading device 1030 that reads station data 300 or the like from a recording medium, a network interface (I/F) 1040 that exchanges data via network with other base station apparatus or the like, a Random Access Memory (RAM) 1050 that temporarily stores various information, and a nonvolatile memory 1060 such as flash memory, which are connected by a bus 1070.

The nonvolatile memory 1060 stores the neighboring cell information management program 1061 having the same function as the neighboring cell information managing unit 150 depicted in FIG. 2, and data for neighboring cell information management 1062 corresponding to the information stored in the storage unit 110 depicted in FIG. 2. The data for neighboring cell information management 1062 may be appropriately distributed and stored in other computer connected via a network.

As the CPU 1010 loads the neighboring cell information management program 1061 from the nonvolatile memory 1060 into the RAM 1050, the neighboring cell information management program 1061 implements a neighboring cell information management process 1051. By the neighboring cell information management process 1051, information is appropriately loaded from the data for neighboring cell information management 1062 and the like into an area allocated thereto in the RAM 1050, and various types of data processing is performed based on the data and the like.

The neighboring cell information management program 1061 is not necessarily stored in the nonvolatile memory 1060, and may be stored in a recording medium such as CD-ROM and read therefrom to be executed by the base station apparatus 1000. Also, the program may be stored in another computer (or a server) or the like connected to the base station apparatus 1000 via a public line, the Internet, a local area network (LAN), a wide area network (WAN) or the like, and downloaded by the base station apparatus 1000 to be executed.

As described above, according to the embodiment, since neighboring cell information is automatically updated by autonomous operation between base stations only when required, it is possible to reduce the number of steps required for maintenance and management of neighboring cell information without burdening on the higher level apparatuses and lines.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A base station apparatus comprising:
a memory that stores a list of coverage cells of the base station apparatus or of a predetermined base station apparatus, for each of coverage cells of the base station apparatus, the coverage cells in the list neighboring the each of coverage cells of the base station apparatus; and
a processor that extracts, from the memory, a combination of a coverage cell of a predetermined base station apparatus and a coverage cell of the base station apparatus, the coverage cell of the predetermined base station apparatus being included in a list for the coverage cell of the base station apparatus, creates a notification message including the combination, and sends the notification message to the predetermined base station apparatus.

2. The base station apparatus according to claim 1, wherein the memory stores control information for controlling handover for each of the coverage cells of the base station apparatus, and the processor acquires control information corresponding to the coverage cell in the combination from the memory to create the notification message including the control information.

3. The base station apparatus according to claim 1, wherein, when connection to other base station apparatus is newly detected on a line for exchanging control information with base station apparatuses, the processor creates the notification message for the other base station apparatus as the predetermined base station apparatus.

4. The base station apparatus according to claim 1, wherein the memory stores a list of neighboring base station apparatuses, and when information in the memory changes, the processor creates the notification message for each of the neighboring base station apparatuses stored in the memory as the predetermined base station apparatus.

5. The base station apparatus according to claim 4, wherein the processor sends, when information in the memory changes, a request for a notification message to each of the neighboring base station apparatuses stored in the memory.

6. The base station apparatus according to claim 1, wherein, upon receipt of a request for the notification message from a base station apparatus, the processor creates the notification message for the base station apparatus as the predetermined base station apparatus.

7. The base station apparatus according to claim 1, wherein the processor, upon receipt of a notification message from other base station apparatus, stores a combination included in the notification message, if not present in the memory, in the memory.

8. A base station apparatus comprising:
a memory that stores a list of coverage cells of the base station apparatus or of other base station apparatus, for each of coverage cells of the base station apparatus, the coverage cells in the list neighboring the each of coverage cells of the base station apparatus; and
a processor that, upon receipt from the other base station apparatus of a notification message including a combination of a coverage cell of the other base station apparatus and a coverage cell of the base station apparatus, the coverage cell of the other base station apparatus neighboring the coverage cell of the base station apparatus, stores the combination, if not present in the memory, in the memory.

9. A neighboring cell information management method comprising:
a first base station apparatus storing, as first neighboring cell information, a list of coverage cells of the first base station apparatus or of a second base station apparatus, for each of first coverage cells of the first base station apparatus, the coverage cells in the list neighboring the each of first coverage cells of the first base station apparatus;
a second base station apparatus storing, as second neighboring cell information, a list of coverage cells of the second base station apparatus or of the first base station apparatus, for each of second coverage cells of the second base station apparatus, the coverage cells in the list neighboring the each of second coverage cells of the second base station apparatus;
the first base station apparatus extracting, from the first neighboring cell information, a combination of a second coverage cell and a first coverage cell, the second coverage cell being included in a list for the first coverage cell of the first base station apparatus;
the first base station apparatus creating a notification message including the combination to send the notification message to the second base station apparatus; and
the second base station apparatus storing, upon receipt of the notification message, the combination, if not present in the second neighboring cell information, to update the second neighboring cell information.

10. The neighboring cell information management method according to claim 9, further comprising the first base station apparatus storing, as own cell information, control information for controlling handover for each of the first coverage cells, wherein
the first base station apparatus creating includes acquiring control information corresponding to the first coverage cell in the combination from the own cell information to create the notification message including the control information.

11. The neighboring cell information management method according to claim 9, wherein the first base station apparatus creates the notification message upon detection of connection of the first base station apparatus to the second base station apparatus on a line for exchanging control information between base station apparatuses.

12. The neighboring cell information management method according to claim 9, wherein the first base station apparatus creates the notification message when the first neighboring cell information changes.

13. The neighboring cell information management method according to claim 9, further comprising the first base station apparatus sending, when the first neighboring cell information changes, a request for a notification message to the second base station apparatus.

14. The neighboring cell information management method according to claim 9, wherein the first base station apparatus creates the notification message upon receipt of a request for the notification message from the second base station apparatus.

* * * * *